(12) United States Patent
Lee et al.

(10) Patent No.: US 12,074,466 B2
(45) Date of Patent: Aug. 27, 2024

(54) VOLTAGE CONTROL OF MULTI-BATTERY SYSTEMS

(71) Applicant: GM Global Technology Operations LLC, Detroit, MI (US)

(72) Inventors: Chunhao J. Lee, Troy, MI (US); Suresh Gopalakrishnan, Troy, MI (US); Dongxu Li, Troy, MI (US); Muhammad Hussain Alvi, Troy, MI (US); Yongjie Zhu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 77 days.

(21) Appl. No.: 18/151,054

(22) Filed: Jan. 6, 2023

(65) Prior Publication Data

US 2024/0235216 A1 Jul. 11, 2024

(51) Int. Cl.
*H02J 7/00* (2006.01)
*B60L 58/12* (2019.01)
*B60L 58/19* (2019.01)
*H02J 7/34* (2006.01)

(52) U.S. Cl.
CPC ............ *H02J 7/0024* (2013.01); *B60L 58/12* (2019.02); *B60L 58/19* (2019.02); *H02J 7/0047* (2013.01); *H02J 7/0063* (2013.01); *H02J 7/00712* (2020.01); *H02J 7/345* (2013.01)

(58) Field of Classification Search
CPC ..................................... H02J 7/0024
See application file for complete search history.

(56) References Cited

U.S. PATENT DOCUMENTS

| | | | |
|---|---|---|---|
| 2019/0359072 A1* | 11/2019 | Takeda | B60L 1/00 |
| 2020/0220364 A1* | 7/2020 | Wang | B60L 53/53 |
| 2021/0237615 A1* | 8/2021 | Long | B60L 3/0046 |
| 2023/0100119 A1* | 3/2023 | Park | G06F 3/0679 |
| | | | 711/154 |

* cited by examiner

*Primary Examiner* — Jared Fureman
*Assistant Examiner* — Esayas G Yeshaw
(74) *Attorney, Agent, or Firm* — CANTOR COLBURN LLP

(57) ABSTRACT

A system for controlling propulsion in a vehicle includes a switching system connected to a battery system connected to a drive unit and to one or more electrical loads by a propulsion bus. A controller is configured to control the switching system to vary a voltage applied to the drive unit. The controller is configured to receive a request to transition between operating modes, the transition including a change of a voltage applied to the drive unit from an initial voltage level to a target voltage level. The controller is configured to sequentially perform deactivating the one or more electrical loads, based on the target voltage being higher than the initial voltage, pre-charging the one or more electrical loads, based on the target voltage being lower than the initial voltage, performing a discharge procedure, and operating the switching system to apply the voltage at the target voltage level.

20 Claims, 9 Drawing Sheets

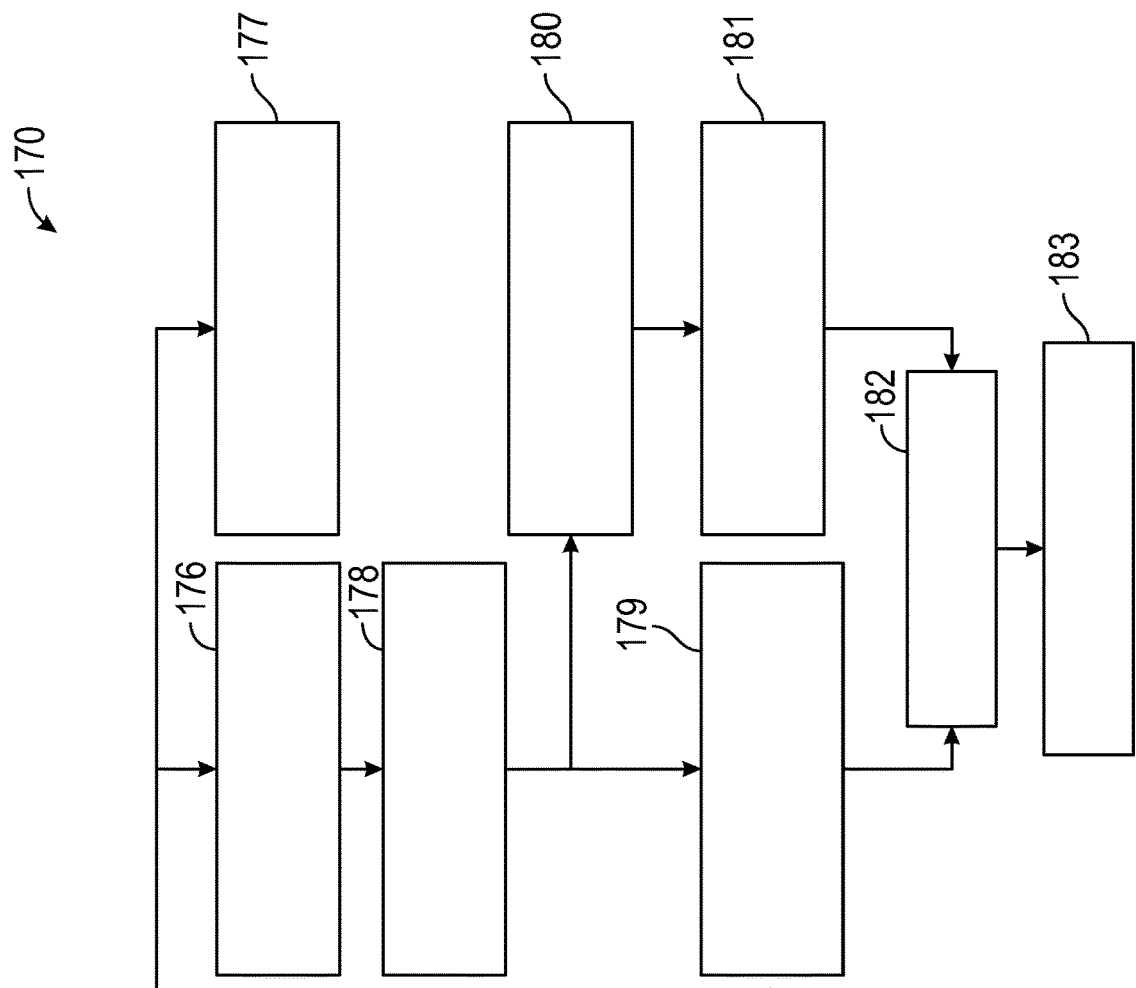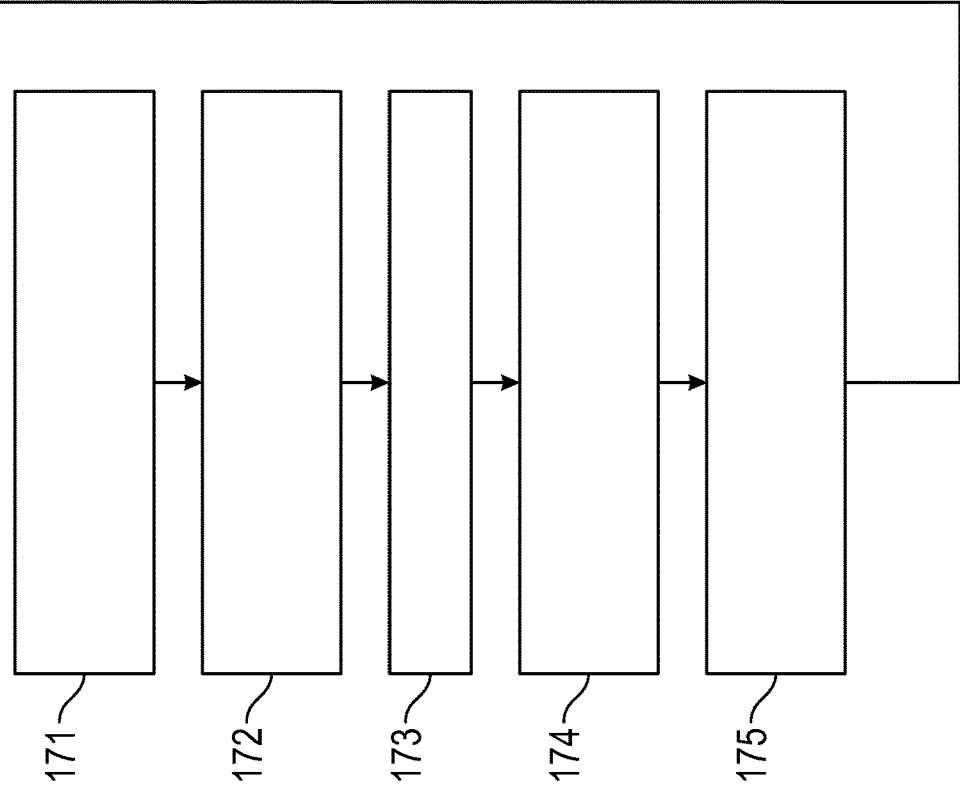
FIG. 7

VOLTAGE CONTROL OF MULTI-BATTERY SYSTEMS

INTRODUCTION

The subject disclosure relates to vehicles, and more specifically, to controlling voltage to an electric drive or drives of a vehicle.

Vehicles, including gasoline and diesel power vehicles, as well as electric and hybrid electric vehicles, feature battery storage for purposes such as powering electric motors, electronics and other vehicle subsystems. Some vehicles feature multi-drive systems that include two or more electric motors for applying torque. For example, some vehicles include a drive system for controlling torque applied to rear wheels, and another drive system for controlling torque to front wheels.

SUMMARY

In one exemplary embodiment, a system for controlling propulsion in a vehicle includes a switching system connected to a battery system, the battery system including a first battery assembly and a second battery assembly selectively connected to a drive unit and to one or more electrical loads by a propulsion bus, the switching system including a first switching device configured to selectively connect the first battery assembly to the propulsion bus, a second switching device configured to selectively connect the second battery assembly to the propulsion bus, and a third switching device configured to selectively connect the first battery assembly to the second battery assembly. The system also includes a controller configured to control the switching system to vary a voltage applied to the drive unit during vehicle propulsion, the controller configured to receive a request to transition from a first operating mode to a second operating mode, the transition including a change of a voltage applied to the drive unit from an initial voltage level to a target voltage level. The controller is configured to sequentially perform deactivating the one or more electrical loads, based on the target voltage being higher than the initial voltage, pre-charging the one or more electrical loads, based on the target voltage being lower than the initial voltage, performing a discharge procedure to discharge a capacitor in each of the one or more electrical loads, and operating the switching system to apply the voltage to the drive unit at the target voltage level.

In addition to one or more of the features described herein, the switching system is operated to connect the first battery assembly to the second battery assembly in series based on the target voltage level being higher than the initial voltage level, and the switching system is operated to connect the first battery assembly to the second battery assembly in parallel based on the target voltage level being lower than the initial voltage level.

In addition to one or more of the features described herein, the first switching device includes a first pair of switches for selectively connecting the first battery assembly to the propulsion bus, and the second switching device includes a second pair of switches for selectively connecting the second battery assembly to the propulsion bus.

In addition to one or more of the features described herein, the switching system includes a pre-charge circuit having a first pre-charge switch connected to the first battery assembly and a second pre-charge switch connected to the second battery assembly.

In addition to one or more of the features described herein, the target voltage is higher than the initial voltage, and in the first operating mode, the first pair of switches is closed, the second pair of switches is closed, the third switching device is open, the first pre-charge switch and the second pre-charge switch are open, and the first battery assembly is connected to the second battery assembly in parallel. The pre-charging includes opening the first pair of switches and opening one of the second pair of switches, closing the third switching device to connect the first battery assembly to the second battery assembly in series, closing the first pre-charge switch and pre-charging the one or more electrical loads to the target voltage level, and subsequent to the one or more electrical loads being at the target voltage level, opening the first pre-charge switch, and closing the one of the second pair of switches.

In addition to one or more of the features described herein, the target voltage is lower than the initial voltage, and in the first operating mode, one of the first pair of switches is open and another of the first pair of switches is closed, one of the second pair of switches is open and another of the second pair of switches is closed, the third switching device is closed, and the first battery assembly is connected to the second battery assembly in series by the third switching device.

In addition to one or more of the features described herein, the discharging includes deactivating the one or more electrical loads, opening the third switching device, opening the another of the first pair of switches, closing the one of the first pair of switches, discharging the one or more electrical loads to the target voltage level, monitoring the voltage during the discharging, and comparing a difference between the monitored voltage and the target voltage, and based on the difference being less than a threshold difference, closing the one of the second pair of switches and closing the another of the first pair of switches to connect the first battery assembly to the second battery assembly in parallel.

In addition to one or more of the features described herein, the one or more electrical loads include a plurality of electrical loads. The discharging includes deactivating the plurality of electrical loads, opening the third switching device, opening the another of the first pair of switches, activating a load of the plurality of electrical loads and closing the one of the first pair of switches, discharging the plurality of electrical loads to the target voltage level through the activated load, monitoring the voltage during the discharging and comparing a difference between the monitored voltage and the target voltage, and based on the difference being less than a threshold difference, closing the one of the second pair of switches and closing the another of the first pair of switches to connect the first battery assembly to the second battery assembly in parallel, and reactivating the plurality of electrical loads.

In addition to one or more of the features described herein, the switching system includes a pre-charge circuit having a first pre-charge switch connected to the first battery assembly and a second pre-charge switch connected to the battery assembly. The discharging includes opening the third switching device, opening the another of the first pair of switches, closing the second pre-charge switch and closing the one of the first pair of switches, discharging the one or more electrical loads to the target voltage level through a resistor connected to the second pre-charge switch, monitoring the voltage during the discharging and comparing a difference between the monitored voltage and the target voltage, and based on the difference being less than a switches, opening the second pre-charge switch and closing the another of the first pair of switches to connect the first battery assembly to the second battery assembly in parallel.

In one exemplary embodiment, a method of controlling propulsion of a vehicle includes receiving a request to transition from a first operating mode to a second operating mode, the transition including a change of a voltage applied to a drive unit of the vehicle from an initial voltage level to a target voltage level. The vehicle includes a switching system connected to a battery system, the battery system including a first battery assembly and a second battery assembly selectively connected to the drive unit and to one or more electrical loads by a propulsion bus, the switching system including a first switching device configured to selectively connect the first battery assembly to the propulsion bus, a second switching device configured to selectively connect the second battery assembly to the propulsion bus, and a third switching device configured to selectively connect the first battery assembly to the second battery assembly. The method also includes deactivating the one or more electrical loads, based on the target voltage being higher than the initial voltage, pre-charging the one or more electrical loads, based on the target voltage being lower than the initial voltage, performing a discharge procedure to discharge a capacitor in each of the one or more electrical loads, and operating the switching system to apply the voltage to the drive unit at the target voltage level.

In addition to one or more of the features described herein, operating the switching system includes connecting the first battery assembly to the second battery assembly in series based on the target voltage level being higher than the initial voltage level, or connecting the first battery assembly to the second battery assembly in parallel based on the target voltage level being lower than the initial voltage level.

In addition to one or more of the features described herein, the first switching device includes a first pair of switches for selectively connecting the first battery assembly to the propulsion bus, and the second switching device includes a second pair of switches for selectively connecting the second battery assembly to the propulsion bus.

In addition to one or more of the features described herein, the switching system includes a pre-charge circuit having a first pre-charge switch connected to the first battery assembly and a second pre-charge switch connected to the second battery assembly. The target voltage is higher than the initial voltage, and in the first operating mode, the first pair of switches is closed, the second pair of switches is closed, the third switching device is open, the first pre-charge switch and the second pre-charge switch are open, and the first battery assembly is connected to the second battery assembly in parallel. The pre-charging includes opening the first pair of switches and opening one of the second pair of switches, closing the third switching device to connect the first battery assembly to the second battery assembly in series, closing the first pre-charge switch and pre-charging the one or more electrical loads to the target voltage level, and subsequent to the one or more electrical loads being at the target voltage level, opening the first pre-charge switch, and closing the one of the second pair of switches.

In addition to one or more of the features described herein, the target voltage is lower than the initial voltage, and in the first operating mode, one of the first pair of switches is open and another of the first pair of switches is closed, one of the second pair of switches is open and another of the second pair of switches is closed, the third switching device is closed, and the first battery assembly is connected to the second battery assembly in series by the third switching device.

In addition to one or more of the features described herein, the discharging includes deactivating the one or more electrical loads, opening the third switching device, opening the another of the first pair of switches, closing the one of the first pair of switches, discharging the one or more electrical loads to the target voltage level, monitoring the voltage during the discharging and comparing a difference between the monitored voltage and the target voltage, and based on the difference being less than a threshold difference, closing the one of the second pair of switches and closing the another of the first pair of switches, to connect the first battery assembly to the second battery assembly in parallel.

In addition to one or more of the features described herein, the one or more electrical loads include a plurality of electrical loads, and the discharging includes deactivating the plurality of electrical loads, opening the third switching device, opening the another of the first pair of switches, activating a load of the plurality of electrical loads and closing the one of the first pair of switches, discharging the plurality of electrical loads to the target voltage level through the activated load, monitoring the voltage during the discharging and comparing a difference between the monitored voltage and the target voltage, and based on the difference being less than a threshold difference, closing the one of the second pair of switches and closing the another of the first pair of switches to connect the first battery assembly to the second battery assembly in parallel, and reactivating the plurality of electrical loads.

In addition to one or more of the features described herein, the switching system includes a pre-charge circuit having a first pre-charge switch connected to the first battery assembly and a second pre-charge switch connected to the battery assembly. The discharging includes opening the third switching device, opening the another of the first pair of switches, closing the second pre-charge switch and closing the one of the first pair of switches, discharging the electrical loads to the target voltage level through a resistor connected to the second pre-charge switch, monitoring the voltage during the discharging and comparing a difference between the monitored voltage and the target voltage, and based on the difference being less than a threshold difference, closing the one of the second pair of switches, opening the second pre-charge switch and closing the another of the first pair of switches, to connect the first battery assembly to the second battery assembly in parallel.

In one exemplary embodiment, a vehicle system includes a memory having computer readable instructions, and a processing device for executing the computer readable instructions, the computer readable instructions controlling the processing device to perform a method. The method includes receiving a request to transition from a first operating mode to a second operating mode, the transition including a change of a voltage applied to a drive unit of the vehicle from an initial voltage level to a target voltage level. The vehicle includes a switching system connected to a battery system, the battery system including a first battery assembly and a second battery assembly selectively connected to the drive unit and to one or more electrical loads by a propulsion bus, the switching system including a first switching device configured to selectively connect the first battery assembly to the propulsion bus, a second switching device configured to selectively connect the second battery assembly to the propulsion bus, and a third switching device configured to selectively connect the first battery assembly to the second battery assembly. The method also includes deactivating the one or more electrical loads, based on the target voltage being higher than the initial voltage, pre-charging the one or more electrical loads, based on the target voltage being lower than the initial voltage, performing a discharge procedure to discharge a capacitor in each of the one or more electrical loads, and operating the switching system to apply the voltage to the drive unit at the target voltage level.

In addition to one or more of the features described herein, operating the switching system includes connecting the first battery assembly to the second battery assembly in series based on the target voltage level being higher than the initial voltage level, or connecting the first battery assembly to the second battery assembly in parallel based on the target voltage level being lower than the initial voltage level.

In addition to one or more of the features described herein, the first switching device includes a first pair of switches for selectively connecting the first battery assembly to the propulsion bus, and the second switching device includes a second pair of switches for selectively connecting the second battery assembly to the propulsion bus.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 7 is a flow diagram depicting aspects of a method of decreasing a level of voltage applied to a vehicle drive system and electrical loads, the method including a performing an active discharge procedure using a pre-charge circuit, in accordance with an exemplary embodiment;

DETAILED DESCRIPTION

Figure 1:
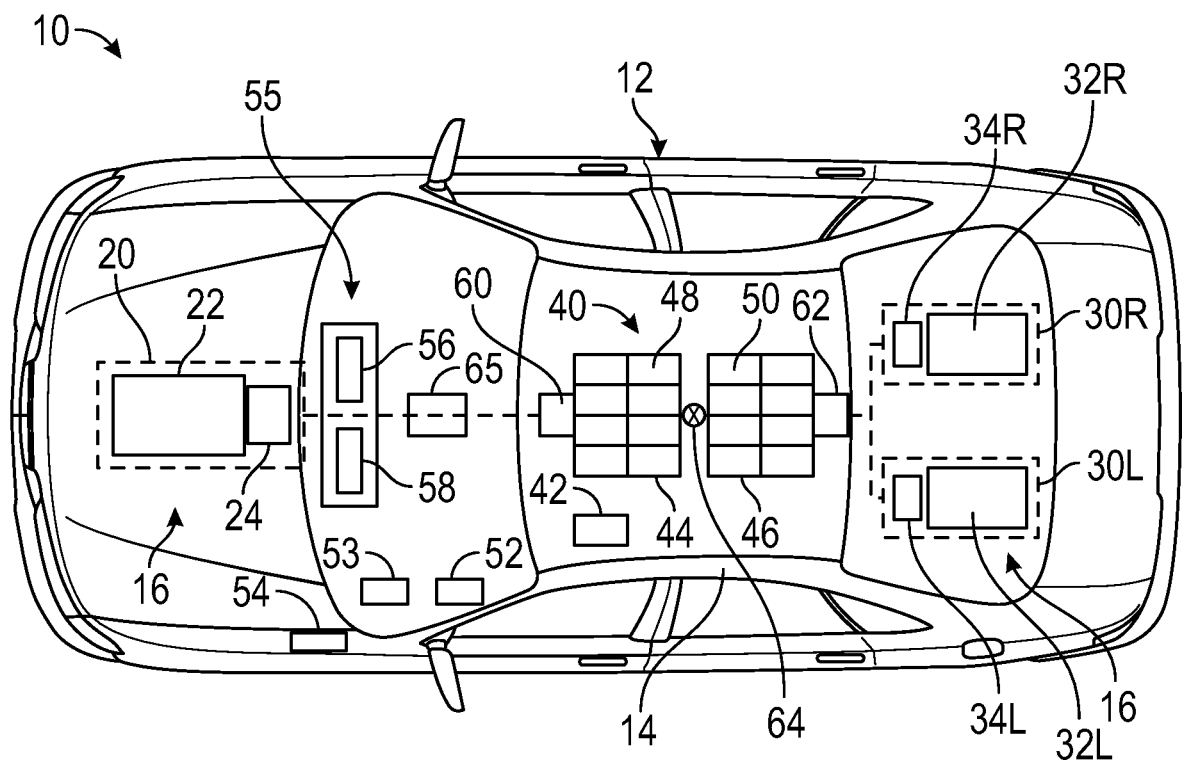
FIG. 1 is a top view of a motor vehicle including a battery system having two separate battery packs or two halves of a single pack, and a switching system for controlling transitions between operating modes, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with exemplary embodiments, methods, devices and systems are provided for controlling propulsion of a vehicle and transitioning between vehicle operating modes associated with different voltage levels. The vehicle includes a drive system including a single drive system or drive unit, or multiple drive systems or drive units. In an embodiment, the vehicle includes a battery system having at least a first battery assembly and a second battery assembly. For example, the first battery assembly includes a first battery pack and the second battery assembly includes a second battery pack. In another example, if the battery system includes a single battery pack (e.g., a single pack with two halves), the first and second battery assemblies may each be a part of the battery pack (e.g., one of the two halves).

The vehicle includes a battery system, and a switching system having independently controllable switching devices that can be operated by a controller to vary a voltage level applied to the drive system and any electrical components (i.e., loads) that receive power from the battery system. The switching devices may be controlled when the vehicle is at rest (e.g., at startup) to initiate a desired operating mode, and when the propulsion system is active (e.g., during driving) to transition the vehicle between various operating modes. In an embodiment, the operating modes are associated with different voltage levels. For example, the switching system includes one or more switches ("series switches") operable to connect the first and second battery packs in series in order to provide a relatively high voltage. The switching system also includes one or more switches ("parallel switches") operable to connect the first and second battery packs in parallel in order to provide a relatively low voltage.

An embodiment of the system includes a controller (or other processing device) configured to control a transition between operating modes using a sequential switching process that ensures effective transition without damaging or otherwise negatively affecting electrical components connected to the battery system. The switching process includes deactivating electrical loads connected to the battery system, performing a pre-charge or discharge procedure to limit or prevent inrush current during a transition, and operating the switching system to increase or decrease the voltage applied to the propulsion system and the electrical loads according to a target voltage level.

This switching process ensures that the electrical components (including drive system inverters and other electrical loads) are not drawing current from the battery system or pushing current into the battery system during the transition, and also ensures that capacitors in the electrical components are pre-charged or discharged to avoid any significant inrush current during the transition.

It is noted that "low voltage" and "high voltage" are relative terms and are not intended to restrict voltage levels to specific values or ranges. For example, embodiments are described herein in conjunction with a low voltage of 400 V or 600V, and a high voltage of 800 V; however, low and high voltages may be any desired or suitable voltage levels or ranges.

The embodiments are not limited to use with any specific vehicle and may be applicable to various contexts. For example, embodiments may be used with automobiles, trucks, aircraft, construction equipment, farm equipment, automated factory equipment and/or any other device or system that includes multiple drives and/or multiple conversion devices.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, and others.

The vehicle 10 may be an electrically powered vehicle (EV), a hybrid vehicle or any other vehicle. In an embodiment, the vehicle 10 is an electric vehicle that includes multiple motors and/or drive systems. Any number of drive units may be included, such as one or more drive units for applying torque to front wheels (not shown) and/or to rear wheels (not shown). The drive units are controllable to operate the vehicle 10 in various operating modes, such as a normal mode, a high performance mode (in which additional torque is applied), all-wheel drive ("AWD"), front-wheel drive ("FWD"), rear-wheel drive ("RWD") and others.

For example, the propulsion system 16 is a multi-drive system that includes a front drive unit 20 for driving front wheels, and rear drive units for driving rear wheels. The front drive unit 20 includes a front electric motor 22 and a front inverter 24 (e.g., front power inverter module or FPIM), as well as other components such as a cooling system. A left rear drive unit 30L includes an electric motor 32L and an inverter 34L. A right rear drive unit 30R includes an electric motor 32R and an inverter 34R. The inverters 24, 34L and 34R (e.g., power inverter units or PIMs) each convert DC power from a high voltage (HV) battery system 40 to poly-phase (e.g., two-phase, three-phase, six-phase, etc.) alternating current (AC) power to drive the motors 22 and 32L and 32R.

As shown in FIG. 1, the drive systems feature separate electric motors. However, embodiments are not so limited. For example, instead of separate motors, multiple drives can be provided by a single machine that has multiple sets of windings that are physically independent.

As also shown in FIG. 1, the drive systems are configured such that the front electric motor 22 drives front wheels (not shown) and the rear electric motors 32L and 32R drive rear wheels (not shown). However, embodiments are not so limited, as there may be any number of drive systems and/or motors at various locations (e.g., a motor driving each wheel, twin motors per axle, etc.). In addition, embodiments are not limited to a dual drive system, as embodiments can be used with a vehicle having any number of motors and/or power inverters.

In the propulsion system 16, the drive units 20, 30L and 30R are electrically connected to the battery system 40. The battery system 40 may also be electrically connected to other electrical components (also referred to as "electrical loads"), such as vehicle electronics (e.g., via an auxiliary power module or APM 42), heaters, cooling systems and others. The battery system 40 may be configured as a rechargeable energy storage system (RESS).

In an embodiment, the battery system 40 includes a plurality of separate battery assemblies, in which each battery assembly can be independently charged and can be used to independently supply power to a drive system or systems. For example, the battery system 40 includes a first battery assembly such as a first battery pack 44 connected to the inverter 24, and a second battery pack 46. The battery pack 44 includes a plurality of battery modules 48, and the battery pack 46 includes a plurality of battery modules 50. Each module 48, 50 includes a number of individual cells (not shown).

Each of the front motor 22 and the rear motors 32L and 32R is a three-phase motor having three phase motor windings. However, embodiments described herein are not so limited. For example, the motors may be any poly-phase machines supplied by poly-phase inverters, and the drive units can be realized using a single machine having independent sets of windings.

The battery system 40 and/or the propulsion system 16 includes a switching system having various switching devices for controlling operation of the battery packs 44 and 46, and selectively connecting the battery packs 44 and 46 to the drive systems 20, 30L and 30R. The switching devices may also be operated to selectively connect the battery pack 44 and the battery pack 46 to a charging system. The charging system can be used to charge the battery pack 44 and the battery pack 46, and/or to supply power from the battery pack 44 and/or the battery pack 46 to charge another energy storage system (e.g., vehicle-to-vehicle (V2V) and/or vehicle-to-everything (V2X) charging). The charging system includes one or more charging modules. For example, a first onboard charging module (OBCM) 52 is electrically connected to a charge port 54 for charging to and from an AC system or device, such as a utility AC power supply. A second OBCM 53 may be included for DC charging (e.g., DC fast charging or DCFC).

In an embodiment, the switching system includes a first switching device 60 that selectively connects to the battery pack 44 to the inverters 24, 34L and 34R, and a second switching device 62 that selectively connects the battery pack 46 to the inverters 24, 34L and 34R. The switching system also includes a third switching device 64 (also referred to as a "battery switching device") for selectively connecting the battery pack 44 to the battery pack 46 in series.

Any of various controllers can be used to control functions of the battery system 40, the switching system and the drive units. A controller includes any suitable processing device or unit, and may use an existing controller such as a drive system controller, an RESS controller, and/or controllers in the drive system. For example, a controller 65 may be included for controlling switching and drive control operations as discussed herein.

The vehicle 10 also includes a computer system 55 that includes one or more processing devices 56 and a user interface 58. The computer system 55 may communicate with the charging system controller, for example, to provide commands thereto in response to a user input. The various processing devices, modules and units may communicate with one another via a communication device or system, such as a controller area network (CAN) or transmission control protocol (TCP) bus.

Figure 2:
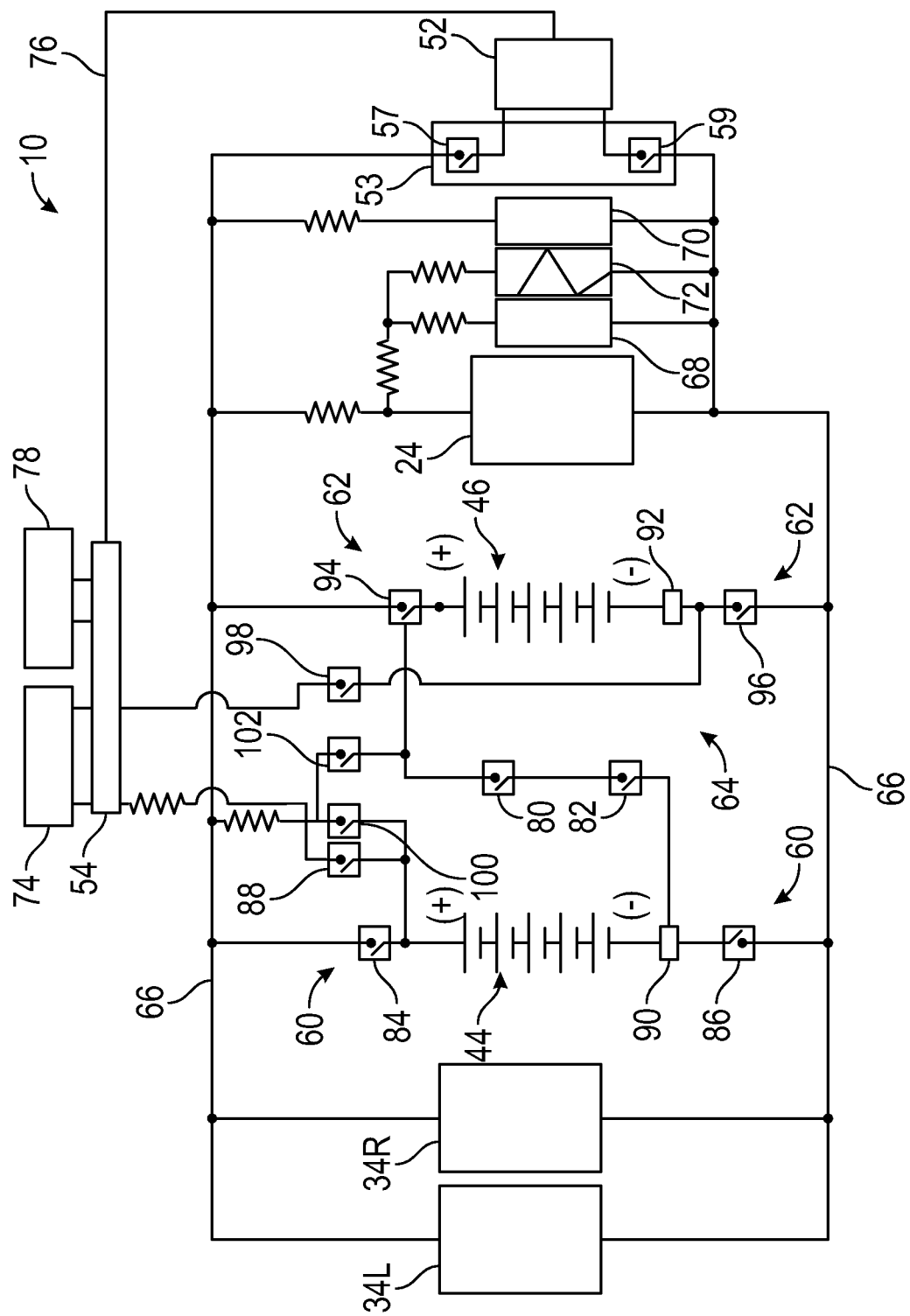
FIG. 2 depicts a vehicle system that includes multiple drive units, a battery system having two separate battery packs or two halves of a single pack, and a switching system including independently operable switching devices for applying variable voltages, in accordance with an exemplary embodiment.

FIG. 2 depicts an embodiment of the switching system, including the switching devices 60, 62 and 64. The embodiments are discussed in conjunction with the vehicle 10 and the dual drive system thereof. Embodiments are not so limited, as they can be used with any suitable vehicle system having multiple (i.e., two or more) drive units and battery packs.

Each switch described herein may be a mechanical contactor (e.g., a solenoid controlled mechanical contactor), or a solid state or electronic device. For example, the embodiment of FIG. 2 depicts the switching devices 60, 62 and 64 as including switches configured as mechanical contactors. However, one or more of the switches may be electronic switches. Each switching device 60, 62 and 64 may be integrated into the battery system circuit, or included as a single device or removable module.

Any suitable solid state or electronic device may be employed as a switch. For example, the switching devices 60, 62 and 64 can include solid state relays and transistors such as Silicon (Si) insulated gate bipolar transistors (IGBTs), and field-effect transistors (FETs). Examples of FETs include metal-oxide-semiconductor FETs (MOSFETs), Si MOSFETs, silicon carbide (Sic) MOSFETs, gallium nitride (GaN) high electron mobility transistors (HEMTs), and SiC junction-gate FETs (JFETs). Other examples of switches that can be used include diamond, gallium oxide and other wide band gap (WBG) semiconductor-based power switch devices.

In an embodiment, the switching system is controllable to supply varying voltages to the inverter 24, the inverter 34L and/or the inverter 34R. In an embodiment, the switching system is controllable to apply a first voltage ("low voltage") to the motor(s), or apply a second voltage ("high voltage"), as discussed further herein. For example, the switching system can be controlled to apply a 400V or 600 V nominal or average voltage in a "low voltage" mode, or an 800V nominal or average voltage in a "high voltage" mode. It is noted that there may be more than two battery packs, with at least one switch between adjacent battery packs; in this case, the batteries can be connected to each other in various ways to provide more than two voltages. In addition, there may be a single battery pack having multiple parts (e.g., a single battery with switches separating parallel strings of cell); in this case, the switching system can be used to apply different voltages by connecting the strings in various ways.

As shown, the front inverter 24, the left rear inverter 34L (a left power inverter module or LPIM), the right rear inverter 34R (a right power inverter module or RPIM), the battery pack 44 and the battery pack 46 are connected in parallel to a propulsion DC bus 66. Additional components may be connected to the propulsion bus 66 for supplying AC power to various electrical loads. The loads may include electrical components such as electronics, and heating and cooling systems (e.g., cabin heaters, cooling systems, etc.).

For example, the loads include an air conditioning electric compressor (ACEC) 68, and an integrated power electronics module (IPEO) 70. As shown, these loads are connected in parallel to the propulsion bus 66. The loads may further include a resistor 72 for current limiting and dissipating current when transitioning between propulsion modes or operating modes as discussed further herein.

For charging to and from the vehicle 10, the OBCM 53 is connected via the propulsion bus 66 to the charge port 54, to permit charging the vehicle 10 from a charging station (e.g., DCFC station 74). The OBCM 53 includes switches 57 (OB1) and 59 (OB2) that allow the OBCM 53 to be connected to and disconnected from the propulsion bus 66.

The OBCM 52 is connected to the propulsion bus 66 through the OBCM 53, and is connected via an AC bus 76 to the charge port 54 for receiving power or supplying power to an AC device 78.

The battery switching device 64 includes at least one switch (also referred to as a "series switch") that can be operated to connect and disconnect the battery packs 44 and 46 to each other in series. The battery switching device 64 may include two switches 80 (SE1) and 82 (SE2) as shown, or may include a single switch. As discussed further herein, the switch 80 (SE2) and/or the switch 82 (SE2) are operable to connect the battery packs 44 and 46 in series to provide a selected voltage level.

The battery packs 44 and 46 may be connected to the DC bus 66 by a fuse device or other device configured to automatically open in response to a collision, accident or other condition for which it is desired to quickly isolate the battery packs 44 and 46. For example, the switching system includes pyrotechnic switches 90 and 92 configured to be activated in response to such an event.

The first switching device 60 includes various switches for selectively connecting the battery pack 44 to components including the inverters and/or electrical loads. A first pair of switches 84 (SA1) and 86 (SA2) is provided for selectively connecting the battery pack 44 to the DC bus 66. The switch 84 (SA1) selectively connects the battery pack 44 to a positive side of the DC bus 66, and the switch 86 (SA2) selectively connects the battery pack 44 to a negative side of the DC bus 66. The switching device 60 may also include a switch 88 (SA3) for selectively connecting the battery pack 44 to the charge port 54 (e.g., for DCFC charging).

The second switching device 62 includes various switches for selectively connecting the battery pack 46 to components including the inverters and/or electrical loads. A second pair of switches 94 (SB1) and 96 (SB2) is provided for selectively connecting the battery pack 46 to the DC bus 66. The switch 94 (SB1) selectively connects the battery pack 46 to a positive side of the DC bus 66, and the switch 96 (SB2) selectively connects the battery pack 46 to a negative side of the DC bus 66. The switching device 62 may also include a switch 98 (SB3) for selectively connecting the battery pack 46 to the charge port 54.

As discussed above, when transitioning between operating modes corresponding to different applied voltages, the switching system is controlled to connect the battery packs 44 and 46 in series or in parallel. During such a transition, capacitors in the inverters and in electrical loads can draw current or push current, resulting in current spikes (inrush current) that are potentially harmful. To prevent such inrush currents, the switching system is configured to perform a method of transitioning between parallel and series connections to change a voltage level, which includes deactivating connected electrical components, and performing a pre-charge or discharge process that allows capacitors to be charged or discharged during a transition.

In an embodiment, to facilitate pre-charging, the switching system includes a pre-charge circuit that includes a first pre-charge switch 100 (PCA) between the battery pack 44 and the propulsion bus 66 (positive side), a second pre-charge switch 102 (PCB) between the battery pack 46 and the propulsion bus 66, and a resistor for current limiting. The pre-charge circuit is operable to pre-charge components when transitioning from a low voltage operating mode (in which the battery packs are connected in parallel) to a high voltage operating mode (in which the battery packs are connected in series). The pre-charge circuit is also operable to facilitate discharging components when transitioning from the high voltage operating mode to the low voltage operating mode.

The switching system may be operated in various configurations or switching states to control which battery pack(s) supplies which inverter(s), and to vary the voltage applied to the inverter(s) and other electrical components. In an embodiment, the battery packs 44 and 46 both have the same nominal voltage (e.g., 400 V), and the switching devices 60, 62 and 64 can be controlled to connect the battery packs 44 and 46 in parallel to supply the low voltage (the low voltage is the same as the battery pack voltages, and total current is sum of currents through the battery packs 44 and 46), and can be controlled to connect the battery packs in series to supply the high voltage (the high voltage is the sum of individual voltages of the battery packs 44 and 46).

In the low voltage operating mode, the switches 80 (SE1) and 82 (SE2) are open (turned OFF), the switches 84 (SA1) and 86 (SA2) are closed (turned ON), and the switches 94 (SB1) and 96 (SB2) are closed. In this switching state, the battery packs 44 and 46 are connected in parallel to the bus 66. The battery pack 44 supplies power to the inverters using the battery voltage (a low voltage, such as 400 V), and the battery pack 46 separately supplies power to the inverters at the low voltage.

In the high voltage operating mode, the switches 80 (SE1) and 82 (SE2) are closed to connect the battery pack 44 in series with the battery pack 46. The switch 84 (SA1) is closed and the switch 86 (SA2) is open. Switch 94 (SB1) is open and switch 96 (SB2) is closed. In this switching state, the battery packs 44 and 46 are connected in series to the bus 66, and the battery packs 44 and 46 both supply power to the inverters and the electrical loads at a high voltage (the high voltage is the sum of the battery voltages, such as 800 V). The resistor 72 is provided to limit current through the electrical loads.

FIGS. 3-8 depict methods of controlling a propulsion system of a vehicle, such as the propulsion system 16, and controlling transitions between operating modes (or initiating operating modes). The methods provide for initiating operating modes when the vehicle is at rest (the vehicle propulsion system is off), and for transitioning between operating modes when the propulsion system is on. Aspects of the methods may be performed by a processor or processors disposed in a vehicle, such as the controller 65. However, the methods are not so limited, as the methods may be performed by any suitable processing device or system, or combination of processing devices.

The methods are discussed in conjunction with the vehicle 10 of FIG. 1 and the switching system of FIG. 2, for illustration purposes. However, the methods are not so limited and can be performed with any suitable vehicle or vehicle system that utilizes multiple battery systems.

Figure 3:
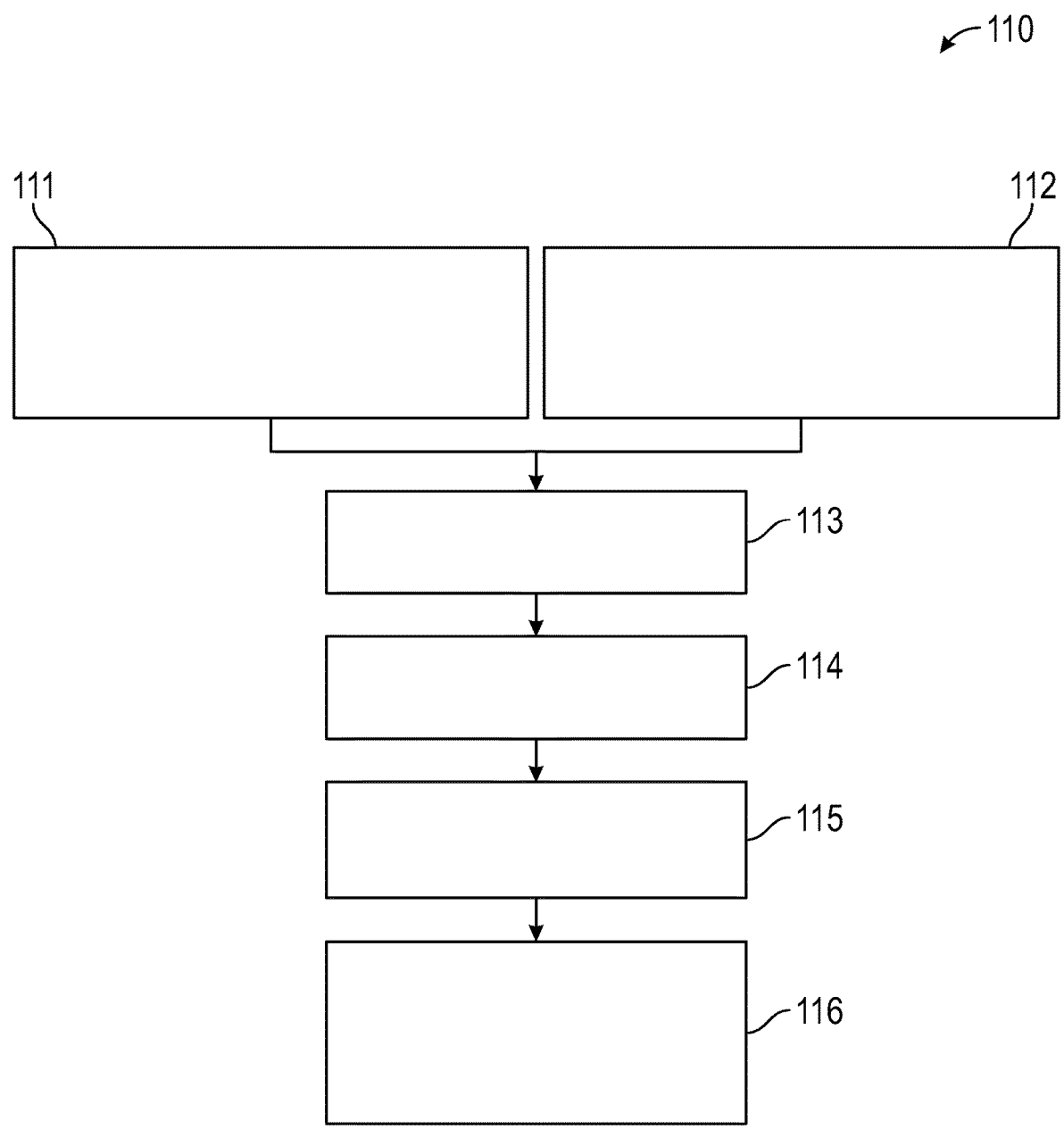
FIG. 3 is a flow diagram depicting aspects of a method of initiating an operating mode of a vehicle, in accordance with an exemplary embodiment.

FIG. 3 illustrates embodiments of a method 110 of controlling a propulsion system of a vehicle, and controlling transitions between operating modes or initiating operating modes when the vehicle is at rest (propulsion system is off). The method 110 includes a number of steps or stages represented by blocks 111-116. The method 110 is not limited to the number or order of steps therein. For example, the steps represented by blocks 111-116 may be performed in sequential order, or in a different order than that described below.

The method 110 commences when the controller 65 receives a request to put the vehicle 10 into an operating mode corresponding to a selected voltage level. The request may be provided by a user or external system, or by a vehicle system.

For example, at block 111, a user input (e.g., via interaction with the computer system 55) is received from a driver or other user. The input may include selecting an operating mode, or providing information about road conditions or other environmental conditions. At block 112, the controller 65 may receive route information, monitoring data (e.g., external camera and/or radar data, user monitoring data related to a driver state, etc.) and/or other information for automated selection of the operating mode.

At block 113, the controller 65 selects the operating mode and associated voltage level. In an embodiment, the controller 65 detects the user request for a specific operating mode, selects the operating mode based on user inputs regarding the environmental condition (e.g., selects low voltage operating mode in an urban environment) or selects the operating mode based on route information.

At block 114, the propulsion system 16 is activated or turned on. For example, the controller 65 activates the propulsion system 16, or transmits a request to a vehicle controller, motor controller or other device or system to activate the propulsion system 16.

At block 115, the controller 65 determines whether the battery packs 44 and 46 are disconnected from the inverters 24, 34L and 34R and electrical loads (i.e., whether the switching devices 60, 62 and 64 are all open). For example, the controller 65 detects the switching position or switching state of each switch of the switching devices 60, 62 and 64. If any of the switches are closed, the controller 65 opens any closed switches. The controller 65 performs any additional functions to ensure that the battery packs 44 and 46 are disconnected from the inverters and electrical loads. Once it is determined that the battery packs 44 and 46 are disconnected, the method 110 proceeds to block 116.

At block 116, the controller 65 initiates the selected operating mode. For example, the controller 65 closes switches 84 (SA1), 86 (SA2), 94 (SB1) and 96 (SB2) to connect the battery packs in parallel to the DC bus 66 (or closes only the switches needed to connect a single battery pack to the DC bus 66), so that energy from the battery pack 44 and/or the battery pack 46 is provided at a low voltage (e.g., 400V). In another example, if the selected operating mode is a high voltage operating mode, the controller 65 closes switches 80 (SE1), 82 (SE2), 84 (SA1) and 96 (SB2) so that energy is provided at a high voltage (e.g., 800 V).

The vehicle 10 can then be operated in the selected operating mode by controlling switches in the inverters 24, 34L and/or 34R to drive the motors 22, 32L and/or 32R.

Figure 4:
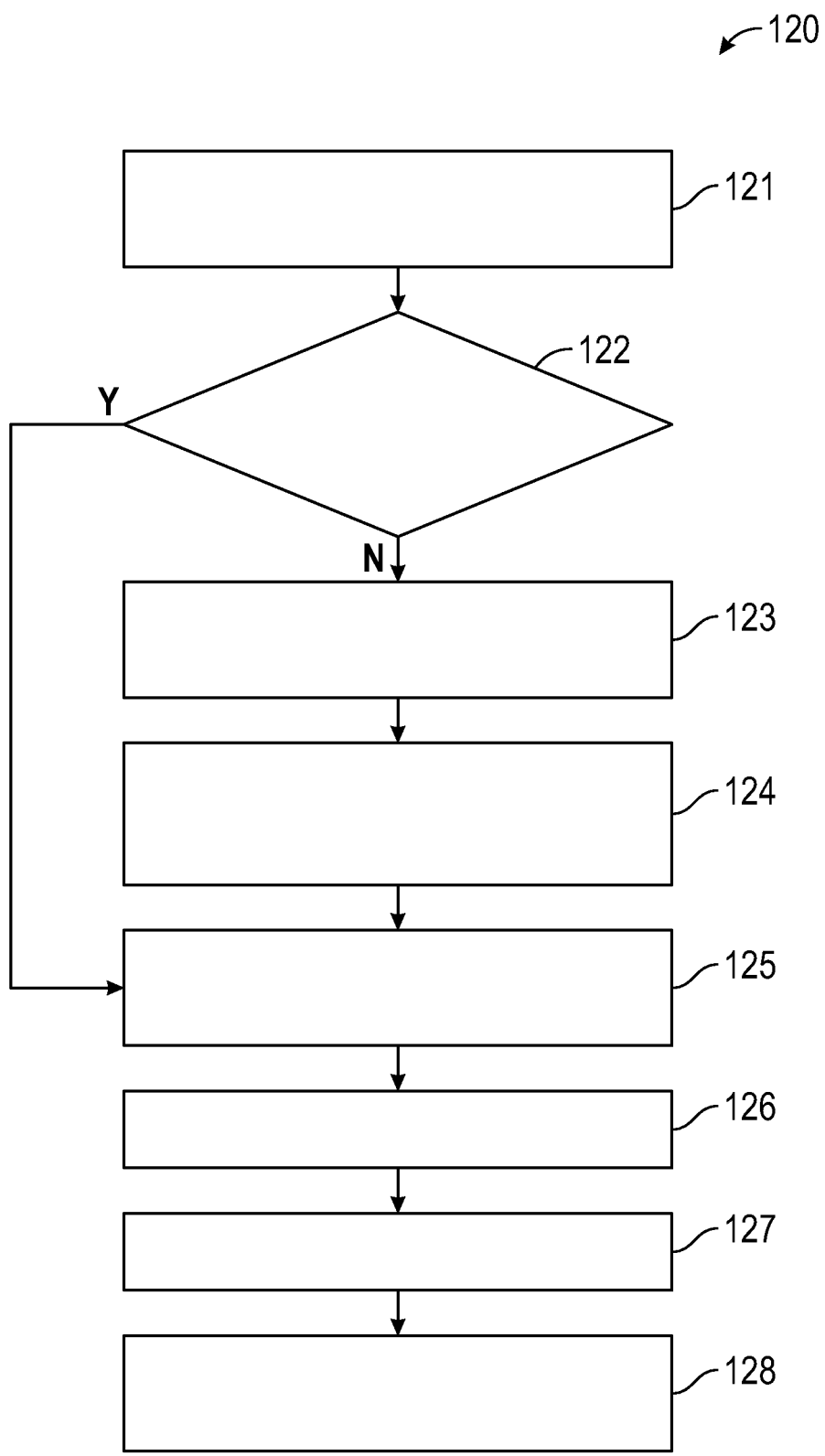
FIG. 4 is a flow diagram depicting aspects of a method of transitioning between operating modes of a vehicle, the operating modes associated with different levels of voltage applied to a vehicle drive system and electrical loads, in accordance with an exemplary embodiment.

FIG. 4 illustrates embodiments of a method 120 of controlling a propulsion system of a vehicle, and controlling transitions between operating modes or initiating operating modes when the vehicle's propulsion system is activated (e.g., during driving). The method 120 includes a number of steps or stages represented by blocks 121-128. The method 120 is not limited to the number or order of steps therein. For example, the steps represented by blocks 121-128 may be performed in sequential order, or in a different order than that described below.

At block 121, the controller 65 receives a request to transition the vehicle 10 from an initial operating mode to a desired or target operating mode. For example, the controller 65 may receive a request to transition from a normal mode at which the motors 22, 32L and/or 32R are driven at a relatively low voltage (e.g., 400 V or 600 V), to a high performance mode or other mode at which the motors 22, 32L and/or 32R are driven at a relatively high voltage (e.g., 800 V). The request may be provided by a user or external system, or by a vehicle system. For example, the request may be an input from a driver, input from another vehicle system (e.g., driver monitoring system, navigation system, etc.) or input from an external device or system. The controller 65 selects the operating mode and associated voltage level based on the request.

At block 122, the controller 65 detects whether the vehicle 10 is in a condition in which the operating mode and applied voltage can be changed without detrimental effects. For example, the controller 65 determines whether a condition is satisfied in which no torque is being applied to the vehicle 10. One such condition is that the vehicle brakes are on and the vehicle 10 is not moving. Another condition is that each motor 22, 32L and 32R is stationary (or below a selected motor speed). If the condition is not satisfied, the method 120 proceeds to block 123. If the condition is satisfied, the method 120 proceeds to block 125.

At block 123, the controller 65 directs the vehicle 10 to apply the brakes (e.g., autonomous braking) or directs the driver to apply the brakes. Optionally, at block 124, the controller 65 may query an appropriate vehicle system to ensure that no torque request has been issued, and/or provide an output (e.g., notification on the user interface 58 or audible notification) to the driver that a transition is in progress.

At block 125, the vehicle 10 is transitioned from the initial operating mode to the desired operating mode. During the transition, the electrical loads (e.g., the ACEC 68 and the IPEO 70) are deactivated or turned off (e.g., put in a standby mode), and the applied voltage is increased or decreased from an initial voltage by controlling the switching system as described herein. Also during the transition, the inverters 24, 34L and 34R, as well as the electrical loads, are pre-charged or discharged to reduce or prevent inrush current.

At block 126, after the transition is complete, the electrical loads are re-activated or turned on. At block 127, the brakes are released (or the user is prompted to release the brakes). A notification that the transition is complete may be provided to the driver via the user interface 58 or other modality (block 128).

Figure 5:
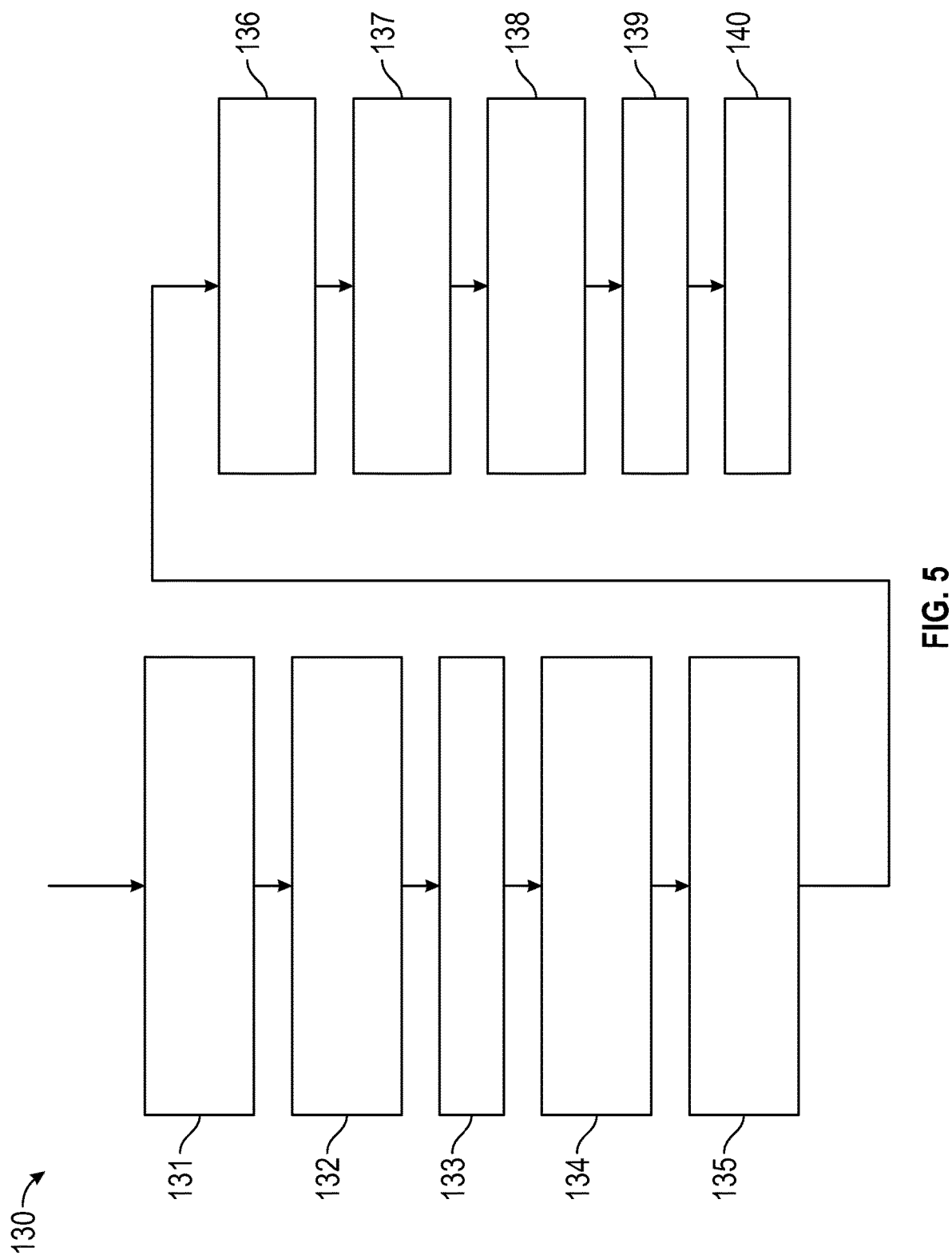
FIG. 5 is a flow diagram depicting aspects of a method of increasing a level of voltage applied to a vehicle drive system and electrical loads, the method including a pre-charge procedure for limiting inrush current, in accordance with an exemplary embodiment.

FIG. 5 depicts an embodiment of a method 130 of transitioning from the initial operating mode, when the target operating mode uses a desired or target voltage level that is greater than the initial voltage level (i.e., level of voltage applied when the vehicle 10 is in the initial operating mode). In the initial operating mode, the battery pack 44 is connected in parallel with the battery pack 46. The switches 80 (SE1) and 82 (SE2) are open, the switch 84 (SA1) is closed and the switch 86 (SA2) is closed. The switch 94 (SB1) is closed and the switch 96 (SB2) is closed.

The method 130 may be performed at block 125 of the method 120. The method 130 includes a number of steps or stages represented by blocks 131-140, but is not limited to the number or order of steps therein.

At block 131, the controller 65 measures current through the series connection between the battery packs 44 and 46, and also measures current through the DC bus 66. If the measured current is at or near zero, the method 130 proceeds to block 132. If not, the method 130 ends.

At block 132, the controller 65 deactivates the electrical loads and the inverters 24, 34L and 34R. For example, the controller 65 sends a signal or otherwise causes the inverters 24, 34L and 34R, and connected electrical loads (e.g., the ACEC 68 and the IPEO 70) to put the inverters and the electrical loads into a standby mode.

At block 133, the voltage of the battery packs 44 and 46 is measured and recorded as a measured initial voltage (HVini).

At block 134, the switch 84 (SA1) is opened, the switch 86 (SA2) is opened, and the switch 94 (SB1) is opened. The switch 96 (SB2) remains closed.

At block 135, a current voltage is measured and compared to the measured initial voltage HVini, to ensure that the switches 84 (SA1), 86 (SA2) and 94 (SB1) successfully opened, and that there are no conditions that could short the battery packs. For example, the difference between HVini and the target voltage is compared to a threshold difference (e.g., about 10 V). If the difference is sufficiently high, the controller 65 confirms that the switches 84 (SA1), 86 (SA2) and 94 (SB1) are all open.

At block 136, if the difference is greater than the threshold difference, the battery packs 44 and 46 are connected in series. For example, switches 80 (SE1) and 82 (SE2) are closed.

At block 137, the controller 65 confirms that the series switches are closed. If the confirmation is successful, at block 138, the pre-charge switch 100 (PCA) is closed, and the battery pack 44 is used to pre-charge the inverters 24, 34L and 34R, and the electrical loads (i.e., charge the capacitors therein). During the pre-charge, current and/or voltage are monitored (e.g., via voltage sensors at each inverter and at each electrical load).

At block 139, the controller 65 monitors the current voltage at the inverters and loads, and compares the current voltage to the target voltage. The target voltage, in an embodiment, is the average voltage of the battery packs. When the current voltage reaches the target voltage (e.g., is the same as, or within a selected range of, the target voltage), the method 130 proceeds to block 140.

At block 140, the switch 84 (SA1) is closed to complete the series circuit and permit operation at the target voltage.

Figure 6:
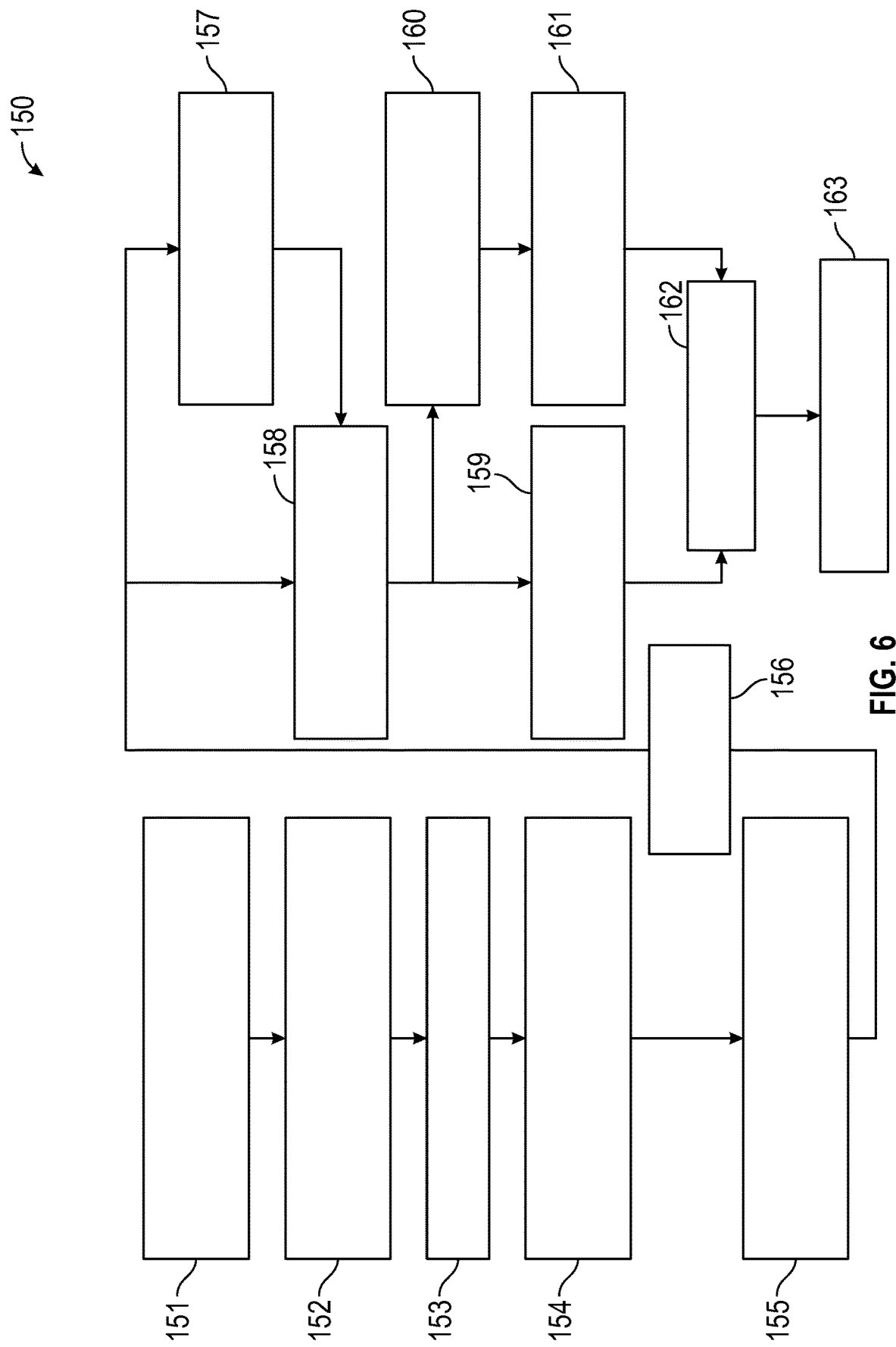
FIG. 6 is a flow diagram depicting aspects of a method of decreasing a level of voltage applied to a vehicle drive system and electrical loads, the method including a passive discharge procedure for limiting inrush current, in accordance with an exemplary embodiment.
Figure 8:
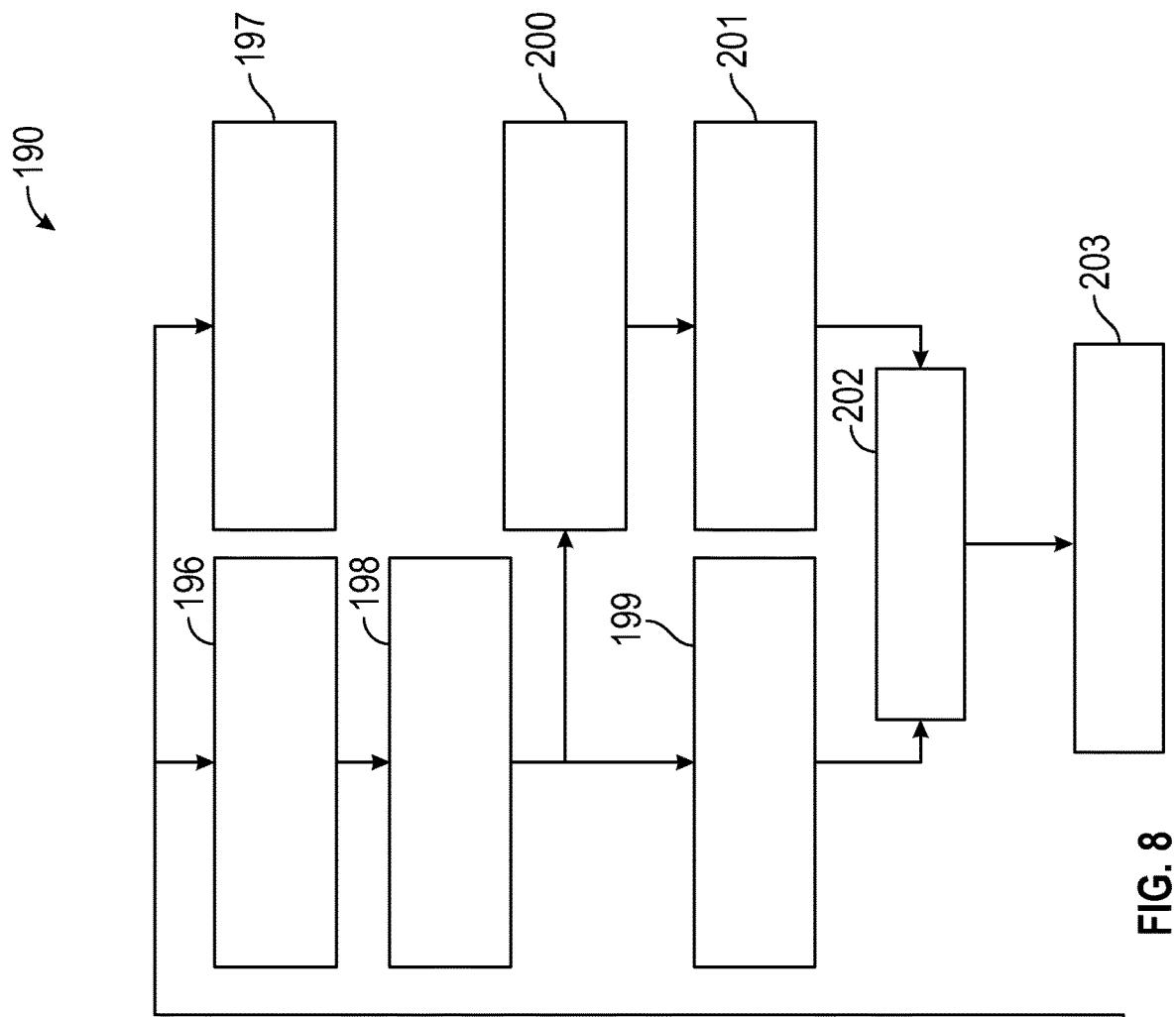
FIG. 8 is a flow diagram depicting aspects of a method of decreasing a level of voltage applied to a vehicle drive system and electrical loads, the method including a performing an active discharge procedure using an electrical load, in accordance with an exemplary embodiment.

FIGS. 6-8 depict embodiments of methods of transitioning from the initial operating mode when the target operating mode uses a desired or target voltage level that is less than the initial voltage level. In each of these methods (methods 150, 170 and 190), the initial operating mode is a high voltage operating mode, and the controller 65 transitions to a low voltage operating mode. In the initial operating mode, the switch 84 (SA1) is closed, the switch 86 (SA2) is open, the switch 94 (SB1) is open, and the switch 96 (SB2) is closed. The switches 80 (SE1) and 82 (SE2) are closed, thereby connecting the battery pack 44 in series with the battery pack 46.

FIG. 6 illustrates embodiments of a method 150 of transitioning from the initial operating mode to the target operating mode. The method 150 may be performed at block 125 of the method 120. The method 150 includes a number of steps or stages represented by blocks 151-163, but is not limited to the number or order of steps therein.

At block 151, the controller 65 measures current through the series connection between the battery packs 44 and 46, and also measures current through the DC bus 66. If the measured current is at or near zero, the method 150 proceeds to block 152. If not, the method 150 ends.

At block 152, the controller 65 deactivates (e.g., puts on standby) the electrical loads and the inverters 24, 34L and 34R. At block 153, the voltage of the battery packs connected in series (a sum of the individual battery pack voltages) is measured and recorded as the measured initial voltage ($HV_{ini}$).

At block 154, the series switches 80 (SE1) and 82 (SE2) are opened. In addition, the switch 84 (SA1) is opened. The switch 96 (SB2) remains closed.

At block 155, a current voltage is measured (e.g., by voltage sensors at the inverters and loads) and compared to the measured initial voltage $HV_{ini}$, to confirm that the switches 80 (SE1), 82 (SE2) and 84 (SA1) are opened. For example, if the difference between $HV_{ini}$ and the target voltage is greater than a selected threshold (e.g., about 10 V), the switches are confirmed to be open.

At block 156, if the difference is greater than the threshold difference, a discharge timer is set, which corresponds to an amount of time needed (or expected to be needed) for the capacitors in the inverters 24, 34L and 34R and the electrical loads to discharge, so that the voltage of these components reduces to the target voltage level.

At block 157, at the end of the timer, the controller 65 closes the switch 86 (SA2), and at block 158, the current voltage is again measured. If the current voltage is within a selected range of the target voltage (e.g., about 50V), the method 150 continues. For example, the target voltage is defined as an average of the voltages of the battery packs 44 and 46, and is compared to the current voltage. If the current voltage is outside of the range, the switch 86 (SA2) is re-opened and the controller 65 waits an additional time period to allow for additional discharge.

At block 159, if the current voltage is within the selected range, the controller 65 closes the switch 94 (SB1). At block 160, the controller 65 confirms that the switch 86 (SA2) is closed, and then closes the switch 84 (SA1) at block 161.

At block 162, the controller 65 confirms that the switch 84 (SA1) and the switch 94 (SB1) are closed. At block 163, the battery packs 44 and 46 are confirmed as connected in parallel to the inverters 24, 34L and 34R and the loads, and the vehicle 10 can be operated at the target voltage in the target operational mode.

FIG. 7 illustrates embodiments of a method 170 of transitioning from the initial operating mode to the target operating mode, which may be performed at block 125 of the method 120. The method 170 includes a number of steps or stages represented by blocks 171-183, but is not limited to the number or order of steps therein.

At block 171, the controller 65 measures current through the series connection between the battery packs 44 and 46, and also measures current through the DC bus 66. If the measured current is at or near zero, the method 170 proceeds to block 172. If not, the method 170 ends. It is noted that, at this stage, the pre-charge switches 100 (PCA) and 102 (PCB) are open.

At block 172, the controller 65 puts the electrical loads and the inverters 24, 34L and 34R on standby, and at block 173, the voltage of the battery packs 44 and 46 connected in series is measured and recorded as the measured initial voltage ($HV_{ini}$). At block 174, the series switches 80 (SE1) and 82 (SE2) are opened, and the switch 84 (SA1) is opened. The switch 96 (SB2) remains closed.

At block 175, a current voltage is measured (e.g., by voltage sensors at the inverters and loads) and compared to the measured initial voltage $HV_{ini}$, to confirm that the switches 80 (SE1), 82 (SE2) and 84 (SA1) are open. For example, if the difference between $HV_{ini}$ and the target voltage is greater than a selected threshold difference, the switches are confirmed to be open.

At block 176, if the difference is greater than the threshold difference, the pre-charge switch 102 (PCB) is closed, and the switch 86 (SA2) is also closed at block 177. The inverters 24, 34L and 34R and the electrical loads are actively discharged via the pre-charge switch 102 (PCB) and the resistor.

At block 178, during the discharging, the controller 65 monitors the current voltage, and compares the current voltage to the target voltage (e.g., an average of the battery pack voltages). The monitoring and comparing can be performed periodically or continuously, and are repeated until the current voltage is within a selected range of the target voltage (e.g., a range of about 50V).

At block 179, if the current voltage is within the selected range, the controller 65 closes the switch 94 (SB1), and subsequently opens the pre-charge switch 102 (PCB). At block 180, the controller 65 confirms that the switch 86 (SA2) is closed, and then closes the switch 84 (SA1) at block 181.

At block 182, the controller 65 confirms that the switch 84 (SA1) and the switch 94 (SB1) are closed. At block 183, the battery packs 44 and 46 are confirmed to be connected in parallel to the inverters and the loads, and the vehicle 10 can be operated at the target voltage in the target operational mode.

FIG. 8 illustrates embodiments of a method 190 of transitioning from the initial operating mode to the target operating mode, which may be performed at block 125 of the method 120. The method 190 includes a number of steps or stages represented by blocks 191-203, but is not limited to the number or order of steps therein.

At block 191, the controller 65 measures current through the series connection between the battery packs 44 and 46, and also measures current through the DC bus 66. If the measured current is at or near zero, the method 190 proceeds to block 192; otherwise, the method 190 ends.

At block 192, the controller 65 puts the electrical loads and the inverters 24, 34L and 34R on standby, and at block 193, the voltage of the battery packs 44 and 46 connected in series is measured and recorded as the measured initial voltage ($HV_{ini}$). At block 194, the series switches 80 (SE1) and 82 (SE2) are opened, and the switch 84 (SA1) is opened. The switch 96 (SB2) remains closed.

At block 195, a current voltage is measured (e.g., by voltage sensors at the inverters and loads) and compared to the measured initial voltage $HV_{ini}$, to confirm that the switches 80 (SE1), 82 (SE2) and 84 (SA1) are opened. For example, if the difference between $HV_{ini}$ and the target voltage is greater than a selected threshold difference, the switches are confirmed to be open.

At block 196, if the difference is greater than the threshold difference, one of the electrical loads is selected as an active component and is re-activated. For example, an electrical component such as the ACEC 68 or the cabin heater is turned on. The switch 86 (SA2) is also closed at block 197. The inverters 24, 34L and 34R and the electrical loads are actively discharged through the active component using active discharge.

For example, the inverters 24, 34L and 34R and the electrical loads are actively discharged by controlling switches in one of the inverters to produce AC current (also referred to as direct axis or d-axis current) in a respective motor without causing torque. In another example, one or more components (e.g., one or more of the inverters 24, 34L and 34R and the electrical loads) are actively discharged using a resistor across a capacitor, by closing a switch between the resistor and the capacitor.

At block 198, during the discharging, the controller 65 monitors the current voltage, and compares the current voltage to the target voltage. The monitoring and comparing can be repeated until the current voltage is within a selected range of the target voltage (e.g., about 50V).

At block 199, if the current voltage is within the selected range, the controller 65 closes the switch 94 (SB1). At block 200, the controller 65 confirms that the switch 86 (SA2) is closed, and then closes the switch 84 (SA1) at block 201.

At block 202, the controller 65 confirms that the switch 84 (SA1) and the switch 94 (SB1) are closed. At block 203, the battery packs 44 and 46 are confirmed to be connected in parallel and the vehicle 10 can be operated at the target voltage in the target operational mode.

Figure 9:
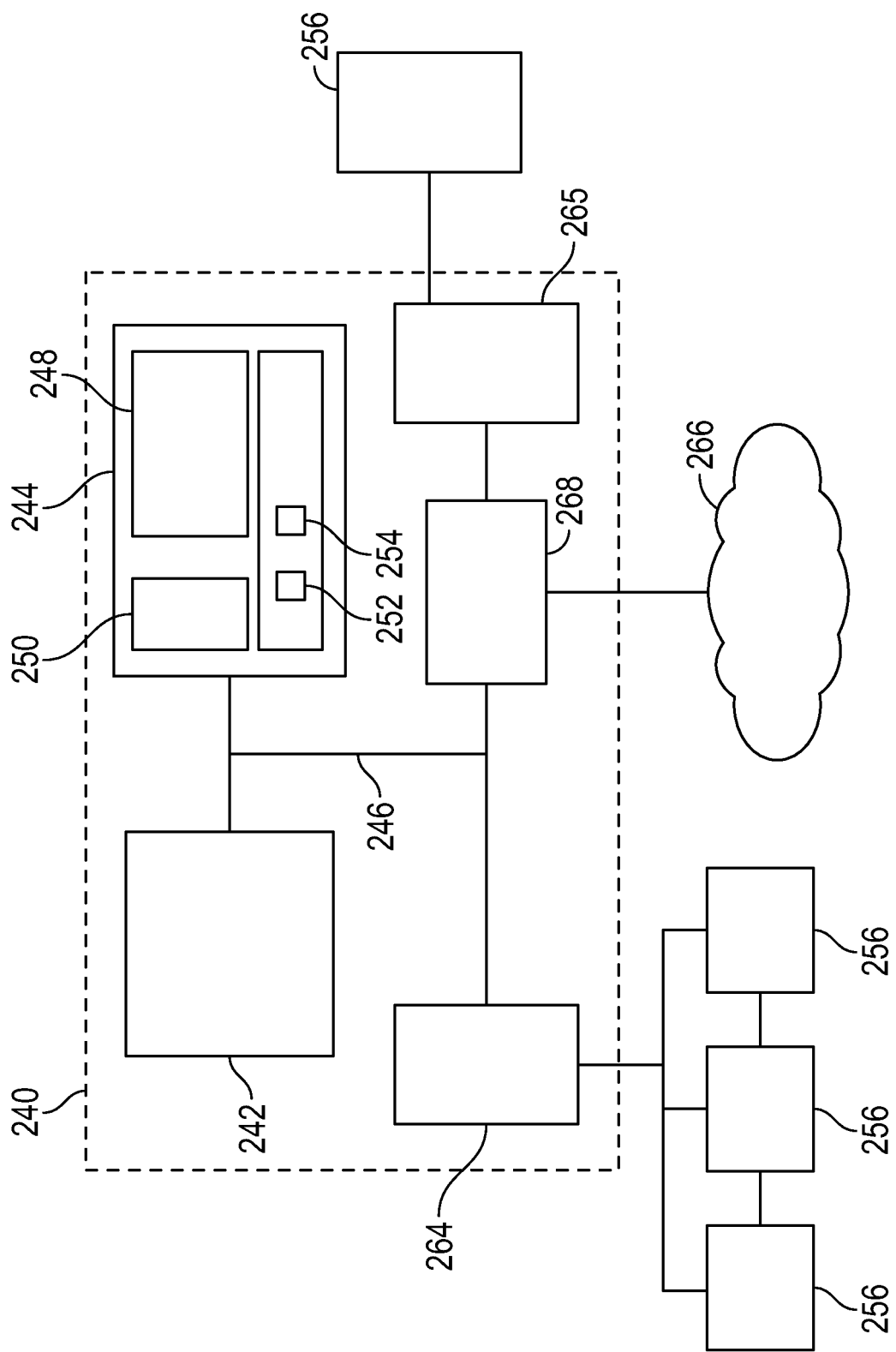
FIG. 9 depicts a computer system in accordance with an exemplary embodiment.

FIG. 9 illustrates aspects of an embodiment of a computer system 240 that can perform various aspects of embodiments described herein. The computer system 240 includes at least one processing device 242, which generally includes one or more processors for performing aspects of image acquisition and analysis methods described herein.

Components of the computer system 240 include the processing device 242 (such as one or more processors or processing units), a memory 244, and a bus 246 that couples various system components including the system memory 244 to the processing device 242. The system memory 244 can be a non-transitory computer-readable medium, and may include a variety of computer system readable media. Such media can be any available media that is accessible by the processing device 242, and includes both volatile and non-volatile media, and removable and non-removable media.

For example, the system memory 244 includes a non-volatile memory 248 such as a hard drive, and may also include a volatile memory 250, such as random access memory (RAM) and/or cache memory. The computer system 240 can further include other removable/non-removable, volatile/non-volatile computer system storage media.

The system memory 244 can include at least one program product having a set (e.g., at least one) of program modules that are configured to carry out functions of the embodiments described herein. For example, the system memory 244 stores various program modules that generally carry out the functions and/or methodologies of embodiments described herein. A module or modules 252 may be included to perform functions related to performing measurements, and a module or modules 254 may be included to perform functions related to controlling switching devices as discussed herein. The system 240 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 242 can also communicate with one or more external devices 256 as a keyboard, a pointing device, and/or any devices (e.g., network card, modem, etc.) that enable the processing device 242 to communicate with one or more other computing devices. Communication with various devices can occur via Input/Output (I/O) interfaces 264 and 265.

The processing device 242 may also communicate with one or more networks 266 such as a local area network (LAN), a general wide area network (WAN), a bus network and/or a public network (e.g., the Internet) via a network adapter 268. It should be understood that although not shown, other hardware and/or software components may be used in conjunction with the computer system 240. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for controlling propulsion in a vehicle, comprising:
a switching system connected to a battery system, the battery system including a first battery assembly and a second battery assembly selectively connected to a drive unit and to one or more electrical loads by a propulsion bus, the switching system including a first switching device configured to selectively connect the first battery assembly to the propulsion bus, a second switching device configured to selectively connect the second battery assembly to the propulsion bus, and a third switching device configured to selectively connect the first battery assembly to the second battery assembly; and
a controller configured to control the switching system to vary a voltage applied to the drive unit during vehicle propulsion, the controller configured to receive a request to transition from a first operating mode to a second operating mode, the transition including a change of a voltage applied to the drive unit from an initial voltage level to a target voltage level, and sequentially perform:
deactivating the one or more electrical loads;
based on the target voltage being higher than the initial voltage, pre-charging the one or more electrical loads;

based on the target voltage being lower than the initial voltage, performing a discharge procedure to discharge a capacitor in each of the one or more electrical loads; and operating the switching system to apply the voltage to the drive unit at the target voltage level.

2. The system of claim 1, wherein the switching system is operated to connect the first battery assembly to the second battery assembly in series based on the target voltage level being higher than the initial voltage level, and the switching system is operated to connect the first battery assembly to the second battery assembly in parallel based on the target voltage level being lower than the initial voltage level.

3. The system of claim 2, wherein the first switching device includes a first pair of switches for selectively connecting the first battery assembly to the propulsion bus, and the second switching device includes a second pair of switches for selectively connecting the second battery assembly to the propulsion bus.

4. The system of claim 3, wherein the switching system includes a pre-charge circuit having a first pre-charge switch connected to the first battery assembly and a second pre-charge switch connected to the second battery assembly.

5. The system of claim 4, wherein the target voltage is higher than the initial voltage, and in the first operating mode, the first pair of switches is closed, the second pair of switches is closed, the third switching device is open, the first pre-charge switch and the second pre-charge switch are open, and the first battery assembly is connected to the second battery assembly in parallel, and the pre-charging includes:
opening the first pair of switches, and opening one of the second pair of switches;
closing the third switching device to connect the first battery assembly to the second battery assembly in series;
closing the first pre-charge switch, and pre-charging the one or more electrical loads to the target voltage level; and
subsequent to the one or more electrical loads being at the target voltage level, opening the first pre-charge switch, and closing the one of the second pair of switches.

6. The system of claim 3, wherein the target voltage is lower than the initial voltage, and in the first operating mode, one of the first pair of switches is open and another of the first pair of switches is closed, one of the second pair of switches is open and another of the second pair of switches is closed, the third switching device is closed, and the first battery assembly is connected to the second battery assembly in series by the third switching device.

7. The system of claim 6, wherein the discharging includes:
deactivating the one or more electrical loads;
opening the third switching device;
opening the another of the first pair of switches;
closing the one of the first pair of switches;
discharging the one or more electrical loads to the target voltage level;
monitoring the voltage during the discharging, and comparing a difference between the monitored voltage and the target voltage; and
based on the difference being less than a threshold difference, closing the one of the second pair of switches, and closing the another of the first pair of switches to connect the first battery assembly to the second battery assembly in parallel.

8. The system of claim 6, wherein the one or more electrical loads include a plurality of electrical loads, and the discharging includes:
deactivating the plurality of electrical loads;
opening the third switching device;
opening the another of the first pair of switches;
activating a load of the plurality of electrical loads, and closing the one of the first pair of switches;
discharging the plurality of electrical loads to the target voltage level through the activated load;
monitoring the voltage during the discharging, and comparing a difference between the monitored voltage and the target voltage; and
based on the difference being less than a threshold difference, closing the one of the second pair of switches and closing the another of the first pair of switches to connect the first battery assembly to the second battery assembly in parallel, and reactivating the plurality of electrical loads.

9. The system of claim 6, wherein the switching system includes a pre-charge circuit having a first pre-charge switch connected to the first battery assembly and a second pre-charge switch connected to the battery assembly, and the discharging includes:
opening the third switching device;
opening the another of the first pair of switches;
closing the second pre-charge switch, and closing the one of the first pair of switches;
discharging the one or more electrical loads to the target voltage level through a resistor connected to the second pre-charge switch;
monitoring the voltage during the discharging, and comparing a difference between the monitored voltage and the target voltage; and
based on the difference being less than a threshold difference, closing the one of the second pair of switches, opening the second pre-charge switch, and closing the another of the first pair of switches to connect the first battery assembly to the second battery assembly in parallel.

10. A method of controlling propulsion of a vehicle, comprising:
receiving a request to transition from a first operating mode to a second operating mode, the transition including a change of a voltage applied to a drive unit of the vehicle from an initial voltage level to a target voltage level, the vehicle including a switching system connected to a battery system, the battery system including a first battery assembly and a second battery assembly selectively connected to the drive unit and to one or more electrical loads by a propulsion bus, the switching system including a first switching device configured to selectively connect the first battery assembly to the propulsion bus, a second switching device configured to selectively connect the second battery assembly to the propulsion bus, and a third switching device configured to selectively connect the first battery assembly to the second battery assembly;
deactivating the one or more electrical loads;
based on the target voltage being higher than the initial voltage, pre-charging the one or more electrical loads;
based on the target voltage being lower than the initial voltage, performing a discharge procedure to discharge a capacitor in each of the one or more electrical loads; and
operating the switching system to apply the voltage to the drive unit at the target voltage level.

11. The method of claim 10, wherein operating the switching system includes one of:
connecting the first battery assembly to the second battery assembly in series based on the target voltage level being higher than the initial voltage level, and
connecting the first battery assembly to the second battery assembly in parallel based on the target voltage level being lower than the initial voltage level.

12. The system of claim 11, wherein the first switching device includes a first pair of switches for selectively connecting the first battery assembly to the propulsion bus, and the second switching device includes a second pair of switches for selectively connecting the second battery assembly to the propulsion bus.

13. The method of claim 12, wherein:
the switching system includes a pre-charge circuit having a first pre-charge switch connected to the first battery assembly and a second pre-charge switch connected to the second battery assembly;
the target voltage is higher than the initial voltage, and in the first operating mode, the first pair of switches is closed, the second pair of switches is closed, the third switching device is open, the first pre-charge switch and the second pre-charge switch are open, and the first battery assembly is connected to the second battery assembly in parallel; and
the pre-charging includes:
opening the first pair of switches, and opening one of the second pair of switches;
closing the third switching device to connect the first battery assembly to the second battery assembly in series;
closing the first pre-charge switch, and pre-charging the one or more electrical loads to the target voltage level; and
subsequent to the one or more electrical loads being at the target voltage level, opening the first pre-charge switch, and closing the one of the second pair of switches.

14. The method of claim 12, wherein the target voltage is lower than the initial voltage, and in the first operating mode, one of the first pair of switches is open and another of the first pair of switches is closed, one of the second pair of switches is open and another of the second pair of switches is closed, the third switching device is closed, and the first battery assembly is connected to the second battery assembly in series by the third switching device.

15. The method of claim 14, wherein the discharging includes:
deactivating the one or more electrical loads;
opening the third switching device;
opening the another of the first pair of switches;
closing the one of the first pair of switches;
discharging the one or more electrical loads to the target voltage level;
monitoring the voltage during the discharging, and comparing a difference between the monitored voltage and the target voltage; and
based on the difference being less than a threshold difference, closing the one of the second pair of switches, and closing the another of the first pair of switches, to connect the first battery assembly to the second battery assembly in parallel.

16. The method of claim 14, wherein the one or more electrical loads include a plurality of electrical loads, and the discharging includes:
deactivating the plurality of electrical loads;
opening the third switching device;
opening the another of the first pair of switches;
activating a load of the plurality of electrical loads, and closing the one of the first pair of switches;
discharging the plurality of electrical loads to the target voltage level through the activated load;
monitoring the voltage during the discharging, and comparing a difference between the monitored voltage and the target voltage; and
based on the difference being less than a threshold difference, closing the one of the second pair of switches and closing the another of the first pair of switches to connect the first battery assembly to the second battery assembly in parallel, and reactivating the plurality of electrical loads.

17. The method of claim 14, wherein the switching system includes a pre-charge circuit having a first pre-charge switch connected to the first battery assembly and a second pre-charge switch connected to the battery assembly, and the discharging includes:
opening the third switching device;
opening the another of the first pair of switches;
closing the second pre-charge switch, and closing the one of the first pair of switches;
discharging the electrical loads to the target voltage level through a resistor connected to the second pre-charge switch;
monitoring the voltage during the discharging, and comparing a difference between the monitored voltage and the target voltage; and
based on the difference being less than a threshold difference, closing the one of the second pair of switches, opening the second pre-charge switch, and closing the another of the first pair of switches, to connect the first battery assembly to the second battery assembly in parallel.

18. A vehicle system comprising:
a memory having computer readable instructions; and
a processing device for executing the computer readable instructions, the computer readable instructions controlling the processing device to perform a method including:
receiving a request to transition from a first operating mode to a second operating mode, the transition including a change of a voltage applied to a drive unit of the vehicle from an initial voltage level to a target voltage level, the vehicle including a switching system connected to a battery system, the battery system including a first battery assembly and a second battery assembly selectively connected to the drive unit and to one or more electrical loads by a propulsion bus, the switching system including a first switching device configured to selectively connect the first battery assembly to the propulsion bus, a second switching device configured to selectively connect the second battery assembly to the propulsion bus, and a third switching device configured to selectively connect the first battery assembly to the second battery assembly;
deactivating the one or more electrical loads;
based on the target voltage being higher than the initial voltage, pre-charging the one or more electrical loads;
based on the target voltage being lower than the initial voltage, performing a discharge procedure to discharge a capacitor in each of the one or more electrical loads; and
operating the switching system to apply the voltage to the drive unit at the target voltage level.

19. The vehicle system of claim 18, wherein operating the switching system includes one of:
- connecting the first battery assembly to the second battery assembly in series based on the target voltage level being higher than the initial voltage level, and
- connecting the first battery assembly to the second battery assembly in parallel based on the target voltage level being lower than the initial voltage level.

20. The vehicle system of claim 19, wherein the first switching device includes a first pair of switches for selectively connecting the first battery assembly to the propulsion bus, and the second switching device includes a second pair of switches for selectively connecting the second battery assembly to the propulsion bus.

* * * * *